March 18, 1930.　　F. B. CUMPSTON　　1,751,305

COTTON GIN

Filed Sept. 6, 1929

INVENTOR.
F. B. Cumpston
BY John M. Spellman
ATTORNEY.

Patented Mar. 18, 1930

1,751,305

UNITED STATES PATENT OFFICE

FREDERICK B. CUMPSTON, OF BLOOMING GROVE, TEXAS, ASSIGNOR TO ASSOCIATED FACTORIES CORPORATION, OF DALLAS, TEXAS, A CORPORATION OF DELAWARE

COTTON GIN

Application filed September 6, 1929. Serial No. 390,699.

This invention relates to improvements in cotton gins, and the general and primary object is to provide a new arrangement and construction of parts for the more expeditious separation of the cotton fibre from its seed.

More particularly the invention seeks to eliminate the ordinary gin ribs through which the gin saws revolve in separating the fibre and seed, and to substitute therefor an assembly or plurality of closely packed and spaced gin saws, carried on shafts, one above the other, and revolving at different speeds.

In conjunction with the saws there are also arranged a cotton seed stripper and an adjustable roller seed board. The result of the combination including the saws is that the fibre is removed from the seed much more quickly and thoroughly without tearing and cutting the fibre and materially reducing the fire hazard.

In the accompanying drawings forming a part of this specification:

Figure 1:
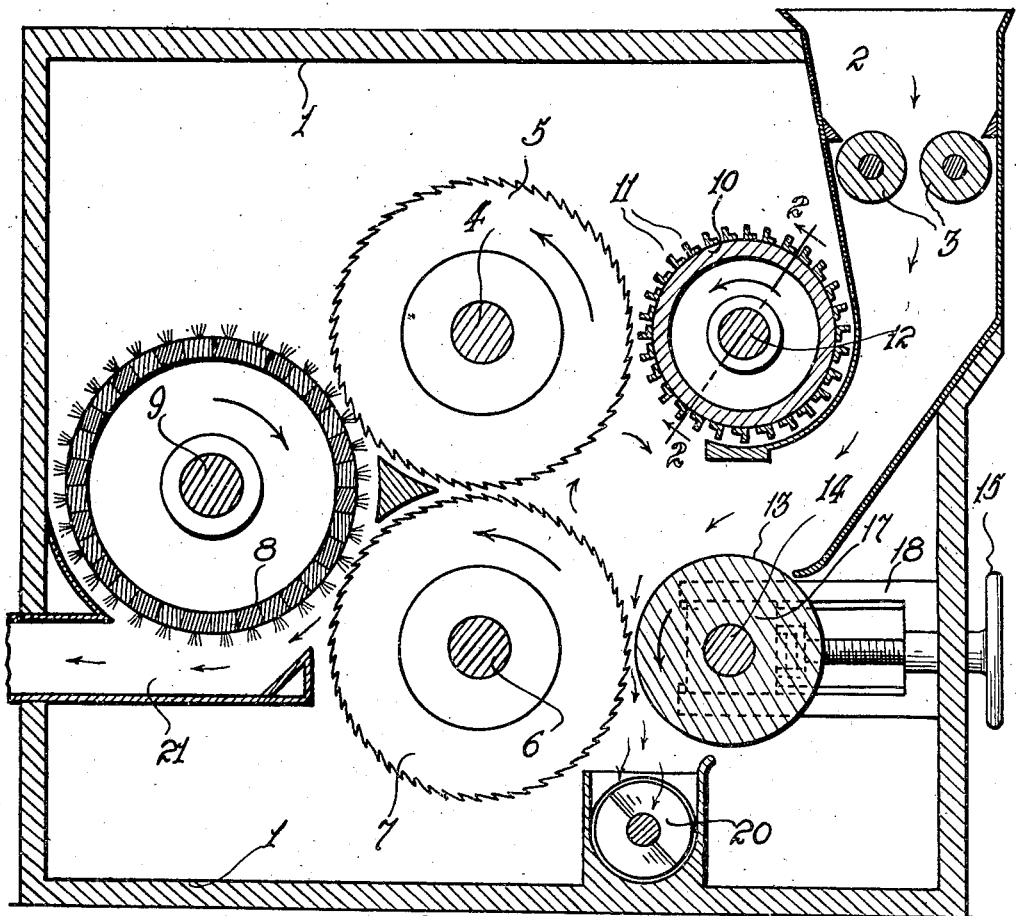
Figure 1 is a sectional detail view through a cotton gin and illustrating an embodiment of the invention.

Referring more in detail to the drawings, 1 denotes a cotton gin housing with feed chute 2 and including the usual feed rollers 3.

Spaced centrally of the housing and journalled in the walls thereof is an upper shaft 4 on which are arranged in closely packed formation a number of saws 5. Directly beneath the shaft 4 is a similar shaft 6, also provided with a like number of saws. These shafts are spaced far enough apart so that the saws of adjacent shafts will be very close together, that is, just sufficient to permit the cotton fibre to pass between the teeth of adjacent saws, but preventing the cotton seed from being pulled through. The shaft 4 is arranged by means of pulleys to be revolved at a speed of approximately 300 R. P. M. while shaft 6 is revolved at about 100 R. P. M. These shafts turn in the direction of the arrows shown thereon, and cause the cotton fed into the chute to assume a tumbling or backward movement from the saws as clearly shown by the arrows, such of the cotton as is pulled from the seed passing between the saw teeth and being doffed by the roller brush 8 on the shaft 9.

Figure 2:
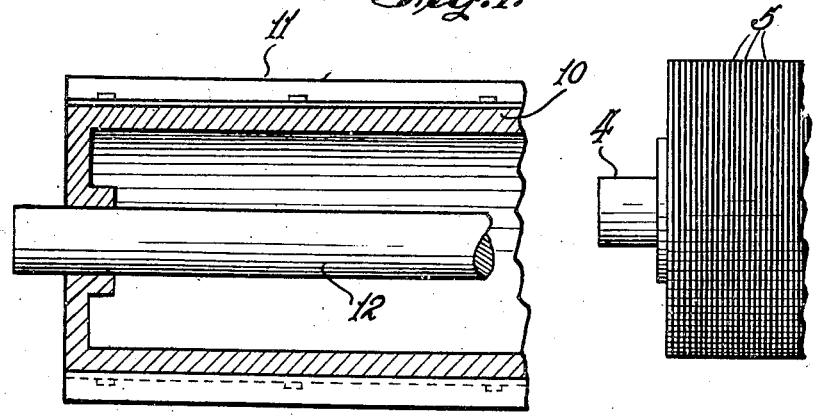
Figure 2 is a partial longitudinal sectional view of the cotton stripper.
Figure 3:
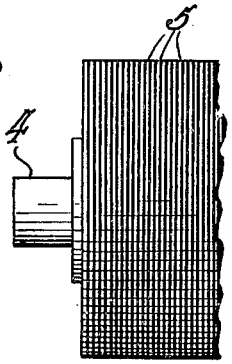
Figure 3 is a detail sectional view, showing in part the saw construction.

In gins of a rib construction, one end of the rib forms a connection with the casing or partition therein, but in the present construction and in place of the ribs there is provided a stripper roll 10 having the angular strips 11 disposed thereon, as shown more clearly in Figure 2. This stripper roll is carried on a shaft 12 journaled in the housing. The stripper forms an important feature of the invention and strips the cotton seed back from the saws on the shaft 4.

Adjacent the saws 7 on the shaft 6 is disposed a roller seed board or drum 13 carried on shaft 14. The stripper is adjustable by means of a wheel 15, the shaft 14 being carried in the blocks 17, movable on the rails or slides of the frame 18.

Beneath the lower saws and seed board is a seed conveyor 20 and next the roller brush 8 is a lint conduit 21.

In the feeding of the cotton to the gin, it first falls upon the roller seed board and is caught by the lower saws 7 and takes the upper direction of the arrow. Such cotton as is not at first pulled from the seed is tumbled over as shown by the arrow next the stripper. Since the upper shaft revolves faster than the lower shaft and both shafts are turning in the same direction, the cotton will be combed between the teeth of the saws, and in actual practice there is a continual inward movement of the cotton by the upper saws and an inverse direction of the fibre toward and on the lower saws which produces a carding effect in removing the seed. The seed can be cleaned so that they will be entirely smooth or left with some lint, depending upon the adjustment of the roller seed board.

While the foregoing discloses a practical work embodiment of the invention, modifications are possible in keeping with the appended claims.

It will be obvious that the present device may be used not only for ginning cotton direct from the field, but also for performing the operations referred to as linting or delinting, in which any lint adhering to the cotton seed after the first ginning operation may be removed. Thus, while the term "gin" is used in connection with the present device, this term is intended to be broadly interpreted as including a linter or delinter.

Likewise, while in the preferred embodiment of the invention, saws are used as the ginning instrumentalities, nevertheless it is obvious that other spaced rotating carding members known to the art may be employed, and the term "ginning instrumentalities" as used in the appended claims is intended to cover the saws and other equivalent devices.

What is claimed as new is:

1. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed.

2. A ribless cotton gin, linter or delinter, comprising means for stripping cotton from the seed, said means consisting solely of coacting, cylindrical, ginning instrumentalities rotating in the same direction about different axes and spaced apart so as not to intersect a plane placed between them and spaced just sufficiently to permit passage of lint between the ginning instrumentalities, but without permitting passage of cotton seed.

3. A ribless cotton gin, linter or delinter, comprising means for stripping cotton from the seed, said means consisting solely of coacting ginning instrumentalities rotating about different axes and spaced apart so as not to intersect a plane placed between them and spaced just sufficiently to permit passage of lint between the ginning instrumentalities, but without permitting passage of cotton seed, said ginning instrumentalities rotating in the same direction about their axes, and being provided on their exterior surfaces with ginning teeth to engage the cotton fibers and detach the same from the seeds.

4. A ribless cotton gin, linter or delinter, comprising means for stripping cotton from the seed, said means consisting solely of coacting rotating ginning instrumentalities spaced apart just sufficiently to permit passage of lint between the ginning instrumentalities, but without permitting passage of cotton seed, said ginning instrumentalities rotating in the same directon but at different speeds.

5. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed, and a doffer roll mounted adjacent said ginning instrumentalities for doffing the lint therefrom.

6. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed, a doffer roll mounted adjacent said ginning instrumentalities for doffing the lint therefrom, and a lint conduit adjacent said doffer roll.

7. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed, a doffer roll mounted adjacent said ginning instrumentalities for doffing the lint therefrom, a lint conduit adjacent said doffer roll, a seed roll for removing cotton seed from the ginning instrumentalities, and a seed conveyor below said seed roll.

8. A ribless cotton gin, linter or delinter, comprising means for stripping cotton from the seed, said means consisting solely of coacting saw assemblies rotating in the same direction about different axes and spaced apart so as not to intersect a plane placed between them and spaced just sufficiently to permit passage of lint between the saw assemblies, but without permitting passage of cotton seed.

9. A ribless cotton gin, in which the ginning elements consist solely of rotating cooperating saw assemblies, each saw assembly comprising a shaft having a plurality of closely set saws mounted thereon, said saw assemblies being mounted in parallel relation, spaced apart sufficiently to allow lint to pass between the saw assemblies, but without permitting passage of cotton seed and rotating in the same direction about their axes, the saw teeth engaging the cotton fibers and detaching the same from the seeds.

10. A ribless cotton gin, linter or delinter, comprising means for stripping cotton fiber from the seed, said means consisting solely of coacting ginning instrumentalities spaced apart sufficiently to permit passage of lint between the ginning instrumentalities, but without permitting passage of cotton seed, said ginning instrumentalities rotating in the same direction about their axes but at different speeds, and provided on their exterior surfaces with ginning teeth to engage the cotton fibers and detach the same from the seeds.

11. A ribless cotton gin, linter or delinter, comprising means for stripping cotton from the seed, said means consisting solely of coacting ginning instrumentalities vertically disposed one above the other, rotating in the same direction about their axes and spaced apart so as not to intersect a plane placed between them and spaced just sufficiently to permit passage of lint between the ginning instrumentalities, but without permitting passage of cotton seed.

12. A ribless cotton gin, linter or delinter, comprising means for stripping cotton from the seed, said means consisting solely of coacting ginning instrumentalities vertically disposed one above the other, rotating in the same direction about their axes and spaced apart so as not to intersect a plane placed between them and spaced just sufficiently to permit passage of lint between the ginning instrumentalities, but without permitting passage of cotton seed, a stripper roll adjacent the upper of said ginning instrumentalities, and a seed conveyor located below the stripper roll.

13. A ribless cotton gin, linter or delinter, comprising means for stripping cotton from the seed, said means consisting solely of coacting ginning instrumentalities vertically disposed one above the other, rotating in the same direction about their axes and spaced apart so as not to intersect a plane placed between them and spaced just sufficiently to permit passage of lint between the ginning instrumentalities, but without permitting passage of cotton seed, a stripper roll adjacent the upper of said ginning instrumentalities, a seed conveyor located below the stripper roll, and a roller seed board intermediate said stripper roll and conveyor, located adjacent the lower of said rotating ginning instrumentalities.

14. A ribless cotton gin, linter or delinter, comprising means for stripping cotton from the seed, said means consisting solely of coacting ginning instrumentalities vertically disposed one above the other, rotating in the same direction about their axes and spaced apart so as not to intersect a plane placed between them and spaced just sufficiently to permit passage of lint between the ginning instrumentalities, but without permitting passage of cotton seed, a stripper roll adjacent the upper of said ginning instrumentalities, a seed conveyor located below the stripper roll, a roller seed board intermediate said stripper roll and conveyor, located adjacent the lower of said rotating ginning instrumentalities, and means for adjusting the distance between the seed board and said lower ginning instrumentality.

15. A ribless cotton gin, linter or delinter, comprising means for stripping cotton from the seed, said means consisting solely of coacting ginning instrumentalities vertically disposed one above the other, rotating in the same direction about their axes and spaced apart so as not to intersect a plane placed between them and spaced just sufficiently to permit passage of lint between the ginning instrumentalities, but without permitting passage of cotton seed, a stripper roll adjacent the upper of said ginning instrumentalities, a seed conveyor located below the stripper roll, and a doffer roll on the side of said ginning instrumentalities opposite the stripper roll for removing lint which has passed between said ginning instrumentalities.

16. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed, means for supplying cotton to be ginned at one side of said ginning instrumentalities, and means for withdrawing lint at the other side.

17. A ribless cotton gin, linter or delinter, comprising means for stripping cotton from the seed, said means consisting solely of coacting ginning instrumentalities rotating in the same direction about different axes and spaced apart so as not to intersect a plane placed between them and spaced just sufficiently to permit passage of lint between the ginning instrumentalities, but without permitting passage of cotton seed, means for supplying cotton to be ginned at one side of said ginning instrumentalities, means for withdrawing lint at the other side, and a stripper roll for removing cotton seed from the ginning instrumentalities, located on the same side as the cotton supply means.

In testimony whereof I affix my signature.

FREDERICK B. CUMPSTON.